US011501512B2

(12) United States Patent
Ito

(10) Patent No.: US 11,501,512 B2
(45) Date of Patent: Nov. 15, 2022

(54) IMAGE PROCESSING APPARATUS, CONTROL METHOD PERFORMED BY THE IMAGE PROCESSING APPARATUS, AND STORAGE MEDIUM, THAT DETERMINE A REGION INCLUDING AN OBJECT AND CONTROL TRANSMISSION AN IMAGE CORRESPONDING TO THE DETERMINED REGION BASED ON SIZE THEREOF

(71) Applicant: CANON KABUSHIKI KAISHA, Tokyo (JP)

(72) Inventor: Hironao Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/702,918

(22) Filed: Dec. 4, 2019

(65) Prior Publication Data

US 2020/0202157 A1 Jun. 25, 2020

(30) Foreign Application Priority Data

Dec. 21, 2018 (JP) .............................. JP2018-240138

(51) Int. Cl.
*H04N 19/167* (2014.01)
*G06V 20/64* (2022.01)
*G06V 10/20* (2022.01)
*G06T 11/60* (2006.01)
*G06V 10/22* (2022.01)

(52) U.S. Cl.
CPC ............ *G06V 10/255* (2022.01); *G06T 11/60* (2013.01); *G06V 10/22* (2022.01); *G06V 20/64* (2022.01); *H04N 19/167* (2014.11)

(58) Field of Classification Search
None
See application file for complete search history.

(56) References Cited

U.S. PATENT DOCUMENTS

| 9,396,400 | B1 * | 7/2016 | Teichman | ............ G06K 9/6218 |
| 9,692,964 | B2 * | 6/2017 | Steinberg | ............... H04N 9/045 |
| 9,704,231 | B1 * | 7/2017 | Kulewski | .................. G06T 5/50 |
| 2002/0126396 | A1 * | 9/2002 | Dolgoff | .................. G09G 3/001 |
| | | | | 359/743 |
| 2007/0279494 | A1 * | 12/2007 | Aman | ..................... G06T 7/269 |
| | | | | 348/169 |
| 2009/0141048 | A1 * | 6/2009 | Fujimoto | ............... H04N 19/17 |
| | | | | 345/673 |
| 2011/0025886 | A1 * | 2/2011 | Steinberg | ................. G06K 9/00 |
| | | | | 348/239 |
| 2011/0050938 | A1 * | 3/2011 | Capata | .................... G06T 7/174 |
| | | | | 348/222.1 |

(Continued)

FOREIGN PATENT DOCUMENTS

JP     2005051709 A     2/2005

*Primary Examiner* — Idowu O Osifade
(74) *Attorney, Agent, or Firm* — Rossi, Kimms & McDowell LLP

(57) ABSTRACT

An image processing apparatus generates, based on an input image, region information indicating a region including an object, determines, based on the region information, a region including an object to be transmitted, and transmits, based on the region information indicating the determined region, an image of the object and region information indicating the determined region.

22 Claims, 6 Drawing Sheets

(56) References Cited

U.S. PATENT DOCUMENTS

| | | | | |
|---|---|---|---|---|
| 2012/0089949 A1* | 4/2012 | Chen | ............... | G06K 9/00335 |
| | | | | 715/848 |
| 2013/0016097 A1* | 1/2013 | Coene | ............... | G06T 7/194 |
| | | | | 345/419 |
| 2013/0064465 A1* | 3/2013 | Tin | ............... | G06T 5/50 |
| | | | | 382/248 |
| 2013/0083153 A1* | 4/2013 | Lindbergh | ............... | H04N 19/115 |
| | | | | 348/14.08 |
| 2013/0258044 A1* | 10/2013 | Betts-Lacroix | ............... | H04N 5/2258 |
| | | | | 348/36 |
| 2014/0002588 A1* | 1/2014 | Ahiska | ............... | G06K 9/00771 |
| | | | | 348/36 |
| 2015/0016747 A1* | 1/2015 | Huang | ............... | G06T 11/60 |
| | | | | 382/282 |
| 2015/0036883 A1* | 2/2015 | Deri | ............... | G06K 9/00369 |
| | | | | 382/103 |
| 2015/0089348 A1* | 3/2015 | Jose | ............... | G06F 16/9577 |
| | | | | 715/234 |
| 2015/0142462 A1* | 5/2015 | Vaidya | ............... | G16H 15/00 |
| | | | | 705/2 |
| 2015/0297949 A1* | 10/2015 | Aman | ............... | G06T 7/246 |
| | | | | 348/157 |
| 2019/0037135 A1* | 1/2019 | Hedge | ............... | G06K 9/00228 |
| 2020/0184103 A1* | 6/2020 | Matusek | ............... | G06F 21/6245 |

\* cited by examiner

IMAGE PROCESSING APPARATUS, CONTROL METHOD PERFORMED BY THE IMAGE PROCESSING APPARATUS, AND STORAGE MEDIUM, THAT DETERMINE A REGION INCLUDING AN OBJECT AND CONTROL TRANSMISSION AN IMAGE CORRESPONDING TO THE DETERMINED REGION BASED ON SIZE THEREOF

BACKGROUND

Field

The present disclosure relates to an image processing apparatus, a control method performed by the image processing apparatus, and a storage medium.

Description of the Related Art

In recent years, a technique has drawn attention in which a plurality of cameras are installed at different positions to perform synchronous photographing from multiple viewpoints and virtual viewpoint images are generated using a plurality of images acquired by the photographing. This technique enables viewing a highlight scene in soccer, basketball, and the like from various angles, for example.

The virtual viewpoint images can be generated as follows: images photographed with a plurality of cameras are separated into a foreground and a background; three-dimensional shape data of an object is generated based on the separated foreground region; and an image viewed from a specified viewpoint is generated by image processing.

When the foreground region to be extracted is large in size or number, it may exceed processing capability of an apparatus for performing foreground-background separation processing, output capability of an interface, and transmission capability to an apparatus for performing subsequent processing, and the like. In that case, data may disappear or become insufficient data because all of the data cannot be processed or transmitted.

In contrast, Japanese Patent Laid-Open No. 2005-51709 discloses a technique for reducing delay by discarding data with lost real-time capability when the delay occurs in transmission in a network.

Unfortunately, when the technique described in Japanese Patent Laid-Open No. 2005-51709 is used for extracting and transmitting data in the foreground region, data is uniformly discarded regardless of the importance of the extracted foreground region. In that case, originally required data will be discarded. Accordingly, for example, the three-dimensional accuracy of an object generated based on the extracted foreground region deteriorates, and the image quality of a virtual viewpoint image also deteriorates. The present disclosure provides a technique for transmitting appropriate data.

SUMMARY

According to one aspect of the present disclosure, there is provided an image processing apparatus comprising: a generating unit configured to generate, based on an input image, region information indicating a region including an object; a determining unit configured to determine, based on the region information, a region including an object to be transmitted; and a transmitting unit configured to transmit, based on the region information indicating the determined region, an image of the object and region information indicating the determined region.

Further features of the present disclosure will be apparent from the following description of exemplary embodiments with reference to the attached drawings.

DESCRIPTION OF THE EMBODIMENTS

An exemplary embodiment(s) of the present disclosure will now be described in detail with reference to the drawings. It should be noted that the relative arrangement of the components, the numerical expressions and numerical values set forth in these embodiments do not limit the scope of the present invention unless it is specifically stated otherwise.

First Embodiment

In a first embodiment, an example will be described in which rectangle information indicating a foreground region is selected by determining a priority according to coordinates, a size, or the like of the foreground when transmission quantity is controlled.

Configuration of Image Processing Apparatus

Figure 1:
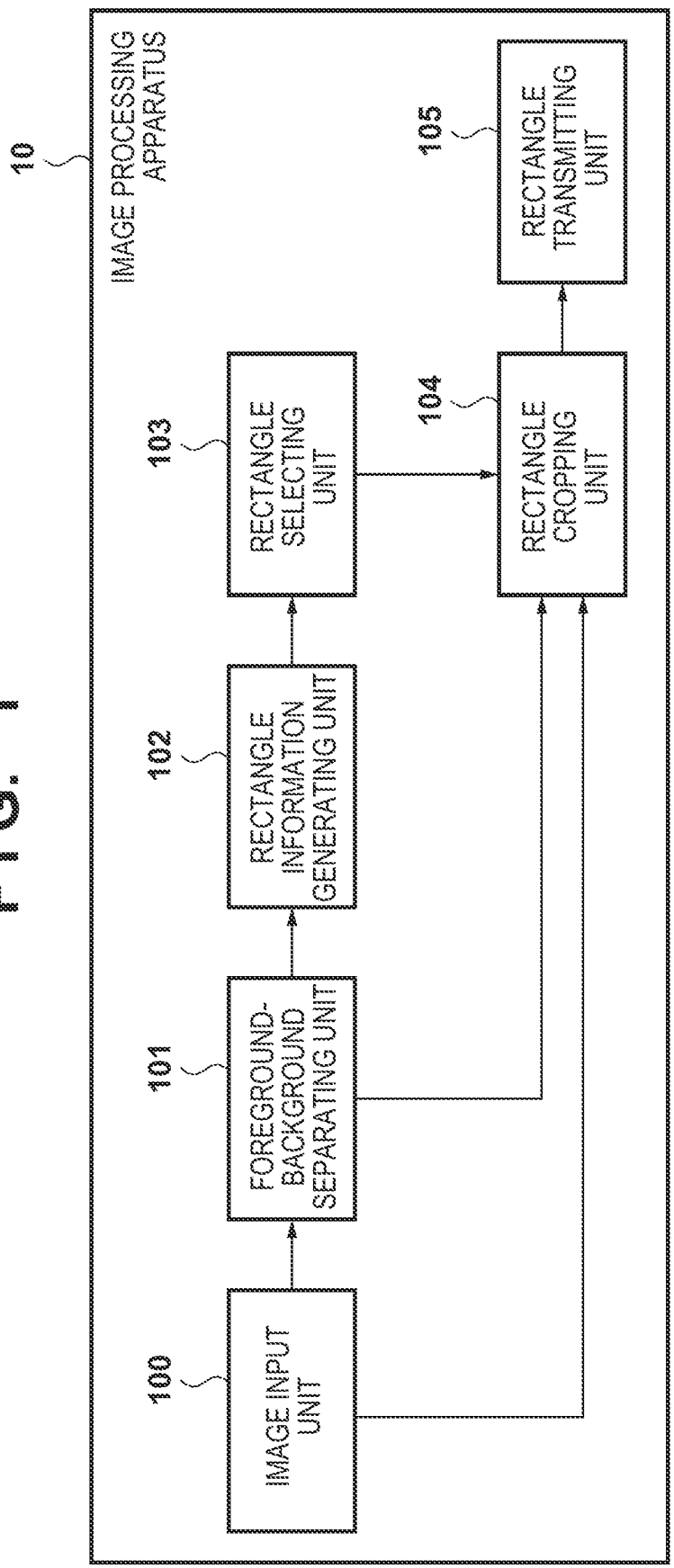
FIG. 1 illustrates an example of a configuration of an image processing apparatus according to a first embodiment.

With reference to FIG. 1, a configuration example of the image processing apparatus according to the first embodiment will be described.

Figure 6:
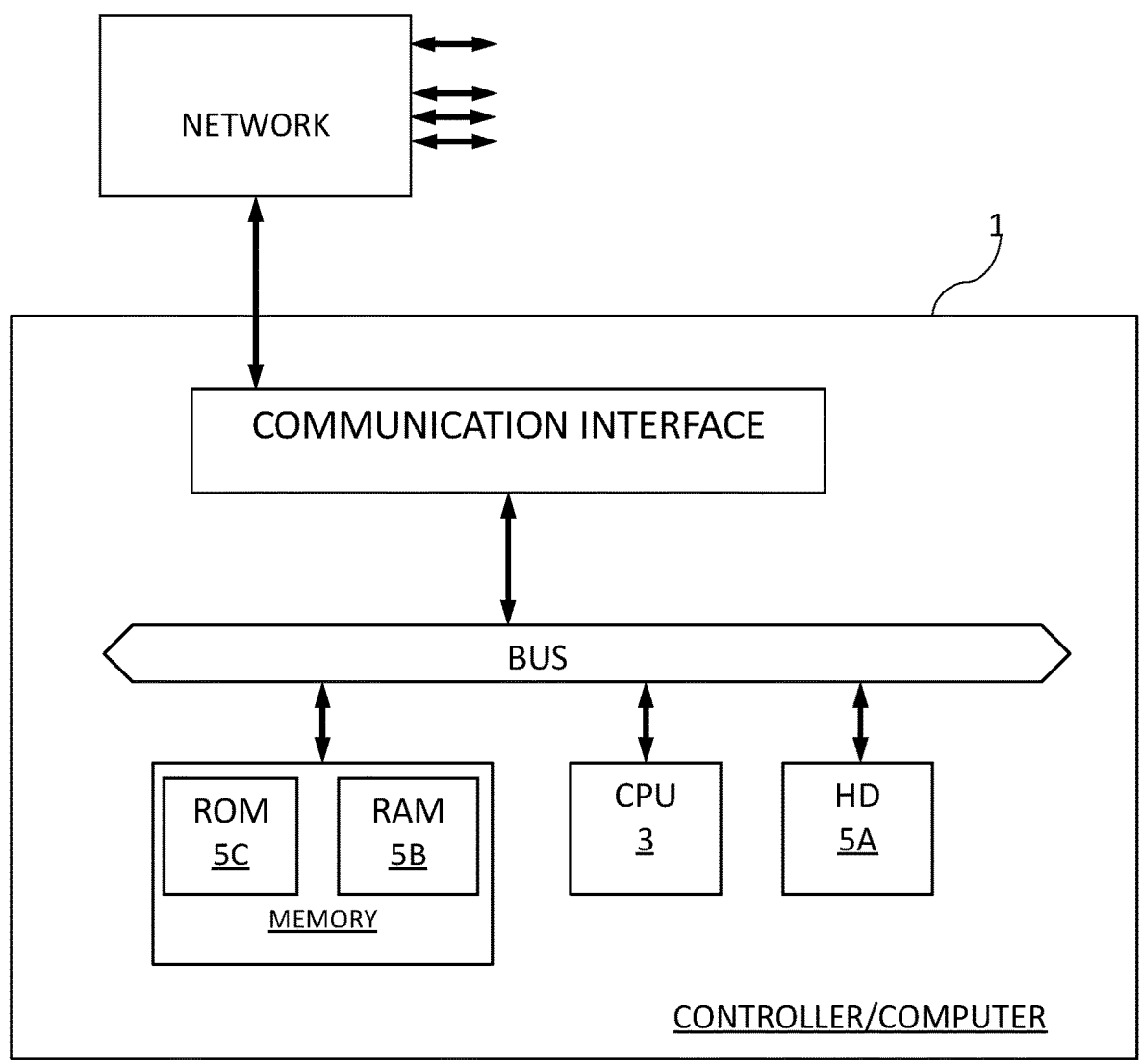
FIG. 6 illustrates a configuration of a computer.

The image processing apparatus 10 includes an image input unit 100, a foreground-background separating unit 101, a rectangle information generating unit 102, a rectangle selecting unit 103, a rectangle cropping unit 104, and a rectangle transmitting unit 105. Functions of the respective processing units of the image processing apparatus 10 are performed by allowing a CPU (see FIG. 6) to read out and execute a computer program stored in a memory (not illustrated).

The image input unit 100 receives camera images photographed with one or more cameras and outputs the camera images to the foreground-background separating unit 101 and the rectangle cropping unit 104. The one or more cameras are installed at different positions around a field such as that of soccer or basketball, for example. These cameras are used to perform synchronous photographing from multiple viewpoints, and images from the multiple viewpoints, acquired by the photographing, are used to generate virtual viewpoint images.

The foreground-background separating unit 101 compares an image received from the input unit 100 with a preliminarily stored background image to perform foreground-background separation processing. As a result of the separation processing, a foreground image represented by a binary image is obtained and is output to the rectangle information generating unit 102 and the rectangle cropping unit 104. The foreground image is here an image of an object, for example. Here, the background image stored by the foreground-background separating unit 101 is a camera image photographed without the foreground. While a technique using a fixed background image is described here, a technique in which a background image is sequentially updated based on camera images received may be used, and the technique is not particularly limited. For example, separation processing may be performed using learning recognition or the like without using a background.

The rectangle information generating unit 102 performs labeling processing on the foreground image received from the foreground-background separating unit 101 to form the foreground connected on the image into one object, and extracts the object. Furthermore, a circumscribing rectangle enclosing the object is calculated and output to a rectangle selecting unit 103 as rectangle information indicating the foreground region. While in the present embodiment, the object is extracted by labeling, the present invention is not limited thereto. For example, clustering using K-means or another method may be used. While in the present embodiment, a rectangle is used as information indicating the foreground, the information indicating the foreground may be represented by using region information of another shape, such as a polygon indicating four points, a combination of a plurality of expressions each indicating a curve, or a shape identical to a shape of the foreground using a free-form shape, for example.

The rectangle selecting unit 103 determines whether the amount of data of the rectangle information exceeds a preset amount of data that can be processed and transmitted (referred to below as a data-amount threshold). When exceeding is determined, rectangles are sorted in descending order of priority based on the rectangle information, and rectangles that do not exceed the data-amount threshold are selected. The selected rectangles are output to the rectangle cropping unit 104 as rectangle information to be processed. The data-amount threshold may be preset or may be dynamically changed. Details of a method for determining priority will be described below.

The rectangle cropping unit 104 performs image adjustment (cropping) using the camera images received from the image input unit 100 and the foreground image received from the foreground-background separating unit 101 based on the rectangle information to be processed acquired from the rectangle selecting unit 103, and generates image data of a rectangle to be transmitted. Furthermore, the rectangle information to be processed to the image data is added and output to the rectangle transmitting unit 105 as transmission data.

The rectangle transmitting unit 105 transmits the transmission data received from the rectangle cropping unit 104.

Method for Determining Priority of Rectangle Information

Here, a method for determining a priority of rectangle information will be described in detail. The priority is determined using information on coordinates, a width, and a height of a rectangle.

(A) Determination by Coordinates of Rectangle

In a determination by coordinates of a rectangle, a priority is determined based on a distance between preset reference coordinates, such as ones being specified by a user, and the coordinates of the rectangle.

Figure 2:
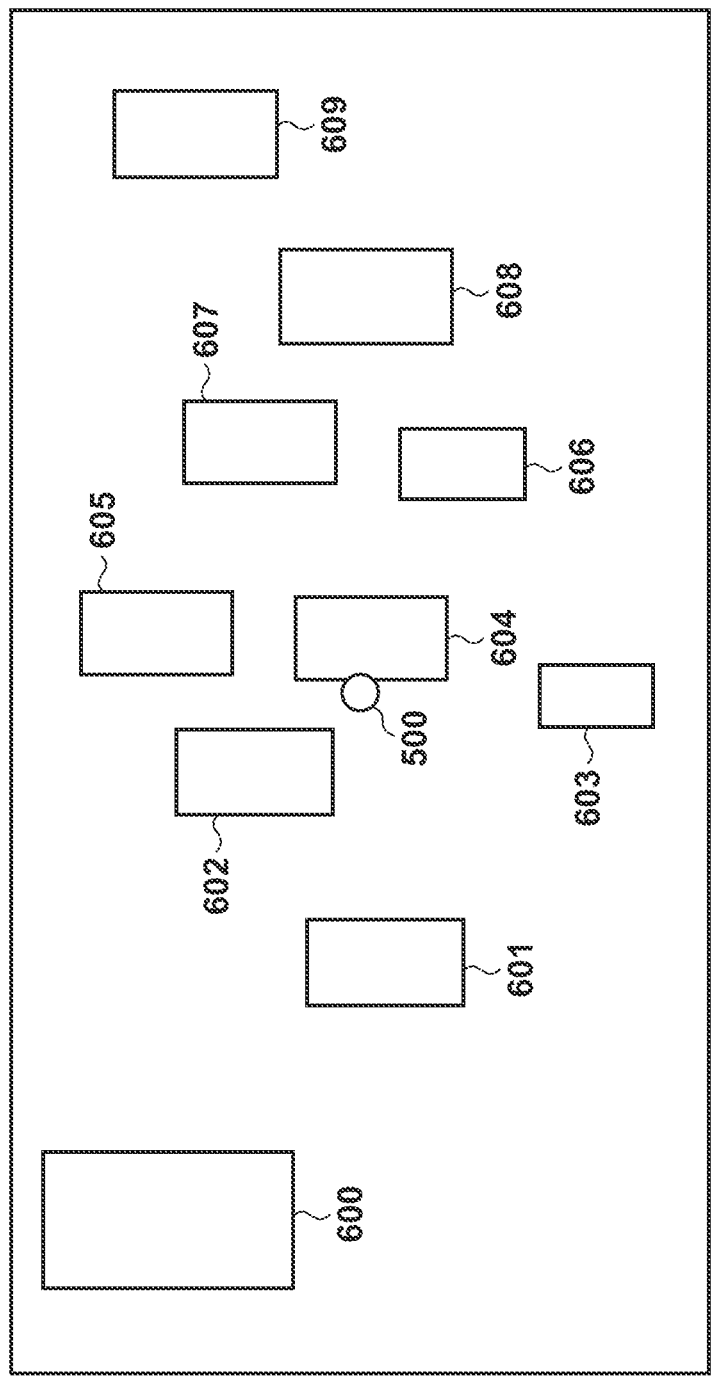
FIG. 2 is a schematic diagram illustrating an example of reference coordinates and rectangle information for determining priority of a rectangle, according to the first embodiment.

Specific description will be given with reference to FIG. 2. FIG. 2 is a simulated view of an image acquired by superimposing, on the image, rectangle information surrounding a foreground, based on a foreground image. FIG. 2 illustrates preset reference coordinates 500 and extracted rectangles 600 to 609. To distinguish the rectangles, a number is applied to each of them. The number for a rectangle may be applied in the generated order or may be determined based on a position of the rectangle. Here, the reference coordinates 500 are denoted as (Xs, Ys). The reference coordinates may be fixed coordinates or may be set dynamically. For example, the reference coordinates may be the center of an image, or may be dynamically set as a position where important play is performed. The coordinates of a rectangle are also expressed according to a rectangle number. For example, coordinates of the centroid of the rectangle 600 are denoted as (X600, Y600). In that case, the distance D between the reference coordinates 500 and the rectangle 600 is calculated by Expression (1) below. While the coordinates of the rectangle used in the determination are defined as the coordinates of the centroid, coordinates of a vertex of the rectangle or a centroid of a foreground portion of a foreground mask may be used, and thus the kind of coordinate is not particularly limited.

[Expression 1]

$$D=\sqrt{(X_s-X_{600})^2+(Y_s-Y_{600})^2} \quad (1)$$

Likewise, coordinates of the centroid of the rectangle 601, 602 ... 609 are expressed as $(X_{601}, Y_{601})$, $(X_{602}, Y_{602})$ ... $(X_{609}, Y_{609})$, respectively. Then, distances D from the reference coordinates 500 acquired for the respective rectangles 600 to 609 by a calculation method similar to Expression (1) are compared with each other, and the rectangle having a shorter distance D is defined as having a higher priority. While one set of the reference coordinates 500 is defined here, a plurality of sets of reference coordinates may be used. In that case, the determination may be performed by using distances from the plurality of sets of reference coordinates, where a distance from each of the sets of reference coordinates is totaled and a rectangle having a shorter total distance is defined as having a higher priority, for example.

While in the present embodiment, a distance is calculated using coordinates of a rectangle, calculation of the distance is not limited thereto, and coordinates of the centroid of an object included in the rectangle may be used for the calculation of the distance. In addition, coordinates closest to or farthest from the reference coordinates, among sets of coordinates of respective vertices of the rectangle, may be used, for example.

(B) Determination by Size of Rectangle

This is a method of determination performed according to a size such as an area, a width, and a height of each of the rectangles 600 to 609. When a width of the rectangle 600 is denoted as $W_{600}$, and a height thereof is denoted as $H_{600}$, an area of the rectangle 600 is acquired as follows: $W_{600} \times H_{600}$. Likewise, areas of the rectangles 601 to 609 are respectively acquired as follows: $W_{601} \times H_{601}$ ... $W_{609} \times H_{609}$. Then, the rectangle having a larger calculated area is defined as having a higher priority. For example, the rectangle having an area exceeding a threshold may be determined as abnormal, and excluded. However, the present invention is not limited thereto, and a rectangle having an area closer to an area of an object (such as a player) desired to be extracted may have a higher priority. It also may be determined whether a rectangle is abnormal based on a width or a height of the rectangle. In addition, the number of pixels determined as a foreground existing in a rectangle may be counted and determined by the number of pixels using an area of the actual foreground. For example, a rectangle having a number of pixels within a predetermined range from a number of pixels of the actual foreground may have a higher priority. In addition, a rectangle having a number of pixels less than a threshold, or equal to or more than the threshold, may be determined as abnormal, and excluded.

(C) Determination by Aspect Ratio

An aspect ratio of a rectangle is calculated, and a rectangle having an aspect ratio closer to an aspect ratio of an object desired to be extracted is defined as having a higher priority. For example, a person being an important object is basically vertically long, and thus an aspect ratio can be used for the person. In addition, a ball or the like has an aspect ratio close to that of a square.

(D) Combination of (A) to (C)

Two or more of the above determination methods may be combined with each other. For example, by the method of (B), a rectangle considered as noise by the number of foreground pixels is excluded, and rectangles having a size and an aspect ratio that probably may not be those of an object desired to be extracted are excluded. Then, a priority is finally determined by the method of (A). In addition, methods other than the above may be combined with each other.

Processing

Figure 3:
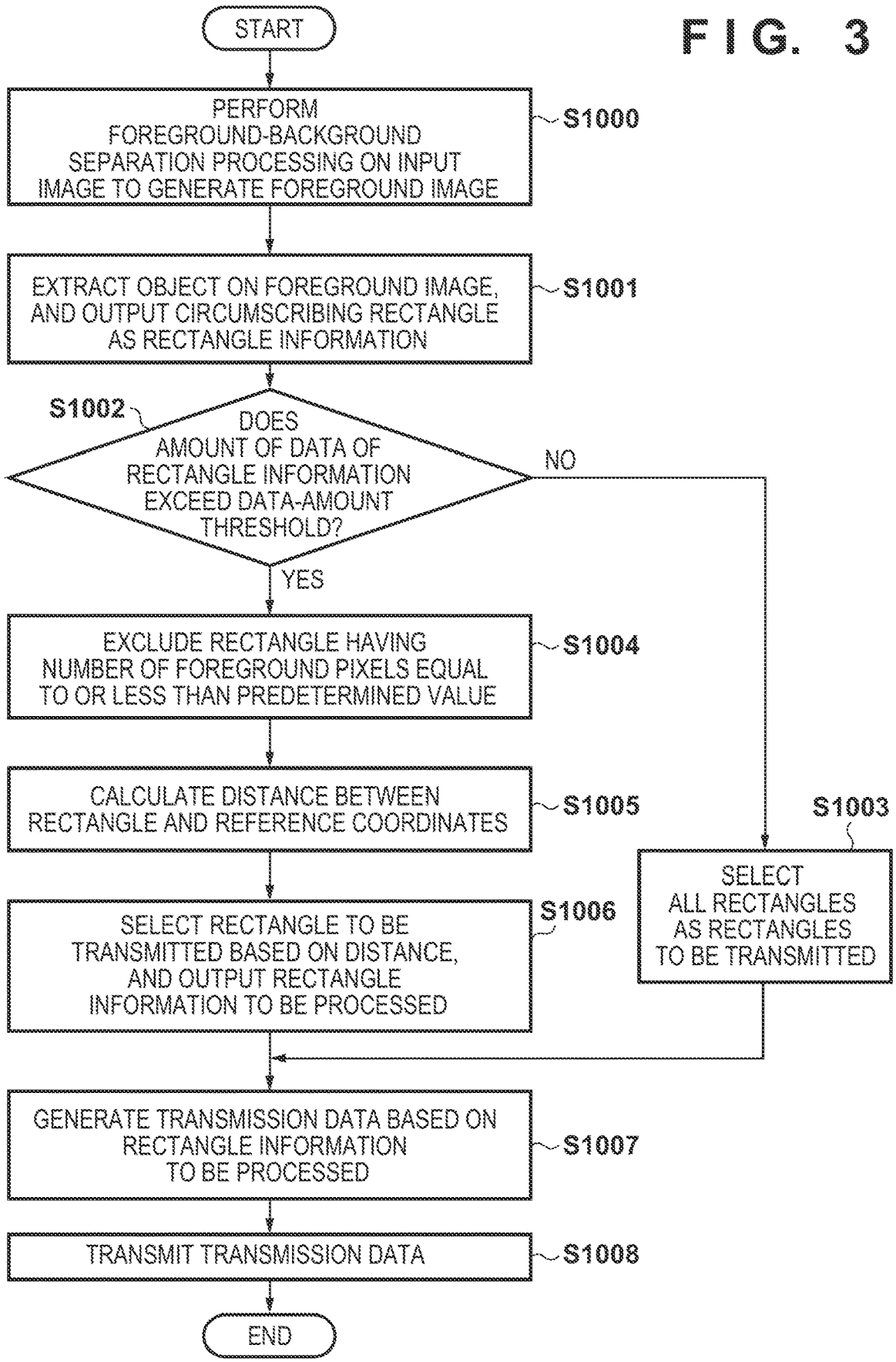
FIG. 3 is a flowchart illustrating a procedure of processing performed by the image processing apparatus according to the first embodiment.

Hereinafter, a procedure of processing performed by the image processing apparatus according to the present embodiment will be described with reference to the flowchart of FIG. 3. In the present embodiment, when the amount of transmission data is controlled, rectangle information indicating a foreground region is selected by determining a priority according to coordinates, a size, or the like of the foreground.

At S1000, the foreground-background separating unit 101 performs foreground-background separation processing on an input image received from the image input unit 100. As a result, a foreground image represented by a binary image is generated, and is output to the rectangle information generating unit 102 and the rectangle cropping unit 104.

At S1001, the rectangle information generating unit 102 performs labeling processing on the received foreground image to form the foreground connected on the image into one integrated object, and extracts the one integrated object. Furthermore, a circumscribing rectangle enclosing the object is calculated and output to a rectangle selecting unit 103 as rectangle information indicating the foreground region.

At S1002, the rectangle selecting unit 103 determines whether the amount of data of the rectangle information (a total of the amount of data of each rectangle) exceeds a data-amount threshold. When the amount of data exceeds the data-amount threshold, the processing proceeds to S1004. In contrast, when the amount of data does not exceed the data-amount threshold, the processing proceeds to S1003.

At S1003, the rectangle selecting unit 103 selects all of the rectangle information as it is as a rectangle that transmits the rectangle information.

At S1004, the rectangle selecting unit 103 calculates the number of foreground pixels included in the rectangular region for each rectangle based on the rectangle information, and excludes a rectangle having the number of foreground pixels equal to or less than a predetermined value. This enables noise to be eliminated.

At S1005, the rectangle selecting unit 103 calculates a distance between coordinates of the centroid of the rectangle and the preset reference coordinates based on the rectangle information.

At S1006, the rectangle selecting unit 103 preferentially selects a rectangle in order from a rectangle having a shortest calculated distance to a rectangle reaching a data-amount threshold that can be processed, and the selected rectangles are defined as rectangles to be processed. Then, rectangle information of the rectangles to be processed is output as rectangle information to be processed to the rectangle cropping unit 104.

At S1007, the rectangle cropping unit 104 crops camera images received from the image input unit 100 and the foreground image received from the foreground-background separating unit 101 based on the rectangle information to be processed, and generates image data to be transmitted. Furthermore, the rectangle information to be processed to the image data is added and outputs to the rectangle transmitting unit 105 as transmission data.

At S1008, the rectangle transmitting unit 105 transmits the transmission data received from the rectangle cropping unit 104.

As described above, in the present embodiment, the rectangle information indicating the foreground region is selected by determining a priority according to coordinates, a size, or the like of the foreground when the amount of transmission data is controlled.

This allows proper data to be left when the amount of data needs to be limited due to an excessive number of rectangles. More specifically, a rectangle that is probably an object desired to be originally extracted by a user can be preferentially left.

Accordingly, even when the amount of data is limited, deterioration in accuracy of three-dimensional shape data of an object generated based on an extracted foreground region can be suppressed, and thus deterioration in image quality of a virtual viewpoint image can be suppressed.

While in the present embodiment, a priority is determined after it is determined whether the amount of data exceeds the data-amount threshold, the present invention is not limited thereto. For example, the transmission data may be always transmitted in order of importance, and may be transmitted for a rectangle immediately before the transmission data exceeds the data-amount threshold.

While in the present embodiment, an example of outputting the transmission data from the rectangle transmitting unit 105 is described, the present invention is not limited thereto. The transmission data may be stored in a storage device (see FIG. 6). In addition, when data needs to be reduced due to insufficient capacity for images stored in the storage device or the like, applying the present embodiment enables the data to be deleted from that on an object having a low priority. Accordingly, accumulated data also can be efficiently reduced.

Second Embodiment

In a second embodiment, an example will be described in which effectiveness of an extracted rectangle is determined based on rectangle information, and in which, for an ineffective rectangle, transmission is controlled without using rectangle information.

Configuration of Image Processing Apparatus

Figure 4:
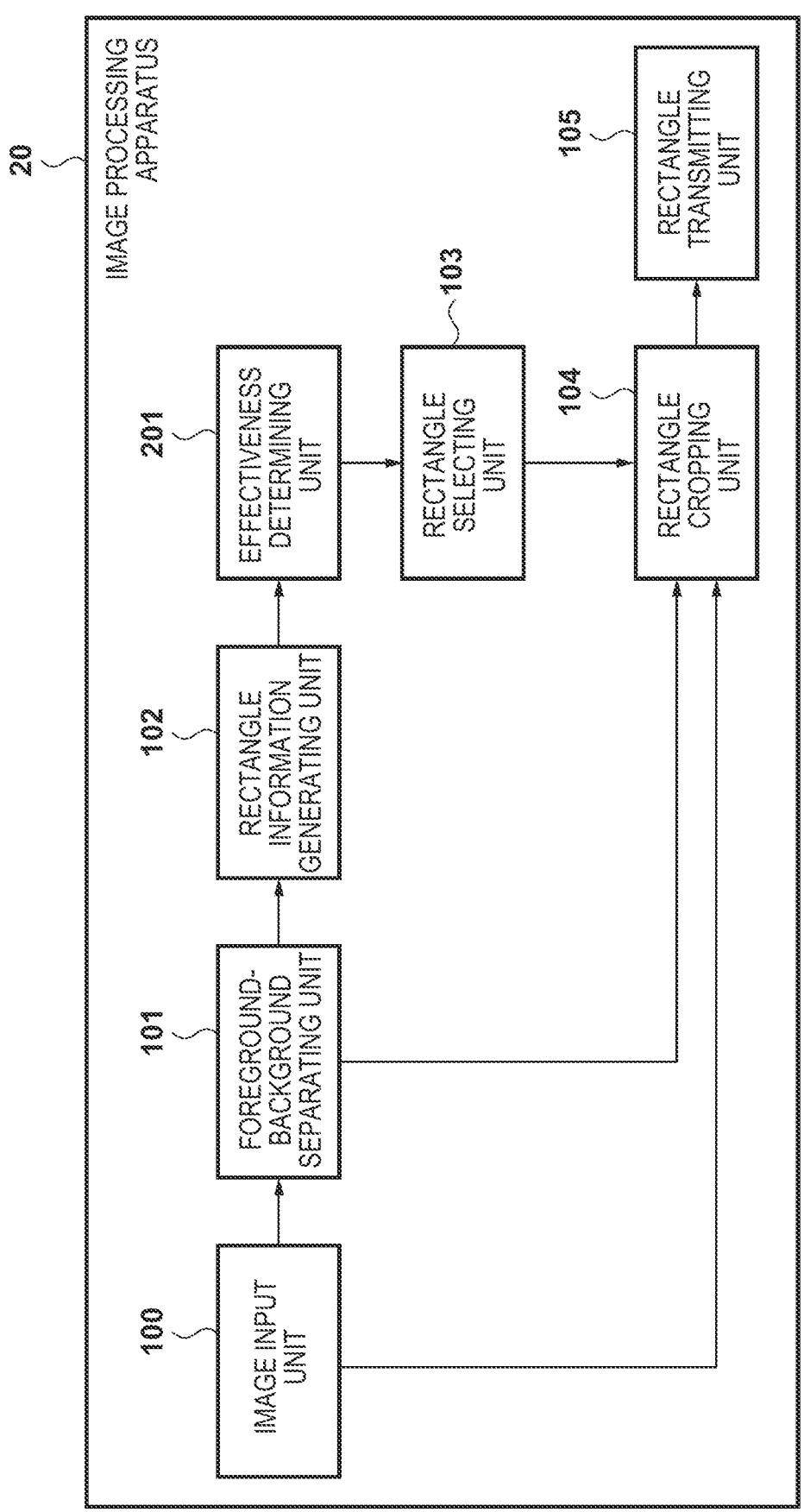
FIG. 4 illustrates an example of a configuration of an image forming apparatus according to a second embodiment.

With reference to FIG. 4, a configuration example of an image processing apparatus according to a second embodiment will be described. Components having the same functions as those of the first embodiment are denoted by the same reference numerals, and duplicated descriptions thereof are eliminated.

An image processing apparatus 20 includes an image input unit 100, a foreground-background separating unit 101, a rectangle information generating unit 102, a rectangle selecting unit 103, a rectangle cropping unit 104, a rectangle transmitting unit 105, and an effectiveness determining unit 201. Functions of the respective processing units of the image processing apparatus 20 are performed by allowing the CPU (see FIG. 6) to read out and execute a computer program stored in the memory (see FIG. 6).

The effectiveness determining unit 201 determines an effectiveness of a rectangle based on rectangle information received from the rectangle information generating unit 102. Transmission of image data and rectangle information is controlled based on a result of the determination of the effectiveness. While various methods of determining the effectiveness are conceivable, the effectiveness of a rectangle can be determined based on a width and a height of the rectangle and coordinate information of the rectangle, for example.

For example, a rectangle is determined as ineffective when the rectangle has a size exceeding a threshold value. This is because it is assumed that an incorrect foreground-background separation result is obtained due to a sudden change in illuminance when a rectangle extending throughout a camera image is extracted. In addition, as described in the first embodiment, a rectangle can be determined as ineffective when only a rectangle having an aspect ratio different from that of an important object is extracted, or when a difference in position of a rectangle from that in a previous frame is more than a threshold, for example.

When determining rectangle information as ineffective, the effectiveness determining unit 201 performs processing of any one of (1) to (3) below.

(1) A rectangle having preset fixed coordinates and a fixed size is output as rectangle information to the rectangle selecting unit 103. For example, when a virtual viewpoint image is generated from images acquired by photographing a soccer game with a plurality of cameras, a rectangle including an audience seat having little change in position and size may be output as rectangle information.

(2) Rectangle information of a previous frame is output to the rectangle selecting unit 103.

(3) Rectangle information indicating that there is no extracted rectangle is output to the rectangle selecting unit 103.

Processing to be performed may be changed for each occurrence phenomenon. For example, when a difference in position of a rectangle from that in the previous frame is more than the threshold, processing directly using the rectangle information of the previous frame of (2) is appropriate. In addition, when the entire camera image is extracted as a rectangle due to a sudden change in illuminance, the whole area of a foreground image is a white image, and thus processing without performing transmission itself by the processing of (3) is appropriate. Note that the coordinates and size in (1) may also be dynamically changed. For example, a position of a rectangle to be present in a current frame is estimated based on movement information of a rectangle extracted in or before the previous frame, and information of a rectangle with a fixed size in which the estimated position is defined as fixed coordinates may be output as rectangle information to the rectangle selecting unit 103.

As described above, in the present embodiment, the effectiveness of an extracted rectangle is determined based on rectangle information, and for an ineffective rectangle, transmission is controlled without using rectangle information.

Accordingly, when inappropriate rectangle information is generated, an effectiveness thereof can be determined and transmission can be performed using appropriate rectangle information. Thus, when sudden change in illumination occurs due to the sun being hidden by clouds to cause the whole area to be extracted as a foreground, for example, improper data can be prevented from being transmitted.

Third Embodiment

In a third embodiment, an example will be described in which transmission data is controlled by controlling compression based on a priority of a rectangle.

Configuration of Image Processing Apparatus

Figure 5:
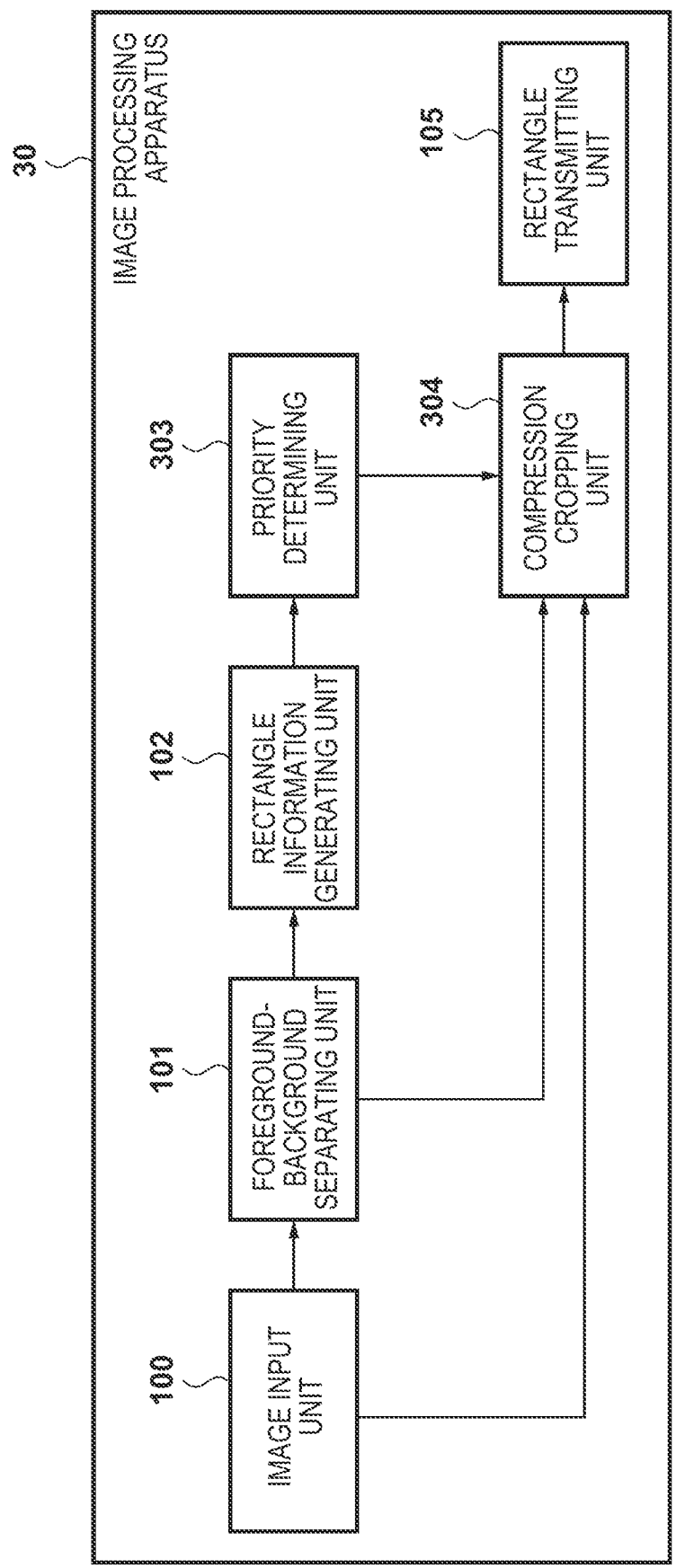
FIG. 5 illustrates an example of a configuration of an image forming apparatus according to a third embodiment.

With reference to FIG. 5, a configuration example of an image processing apparatus according to a third embodiment will be described. Components having the same functions as those of the first embodiment are denoted by the same reference numerals, and duplicated descriptions thereof are eliminated. An image processing apparatus 30 includes an image input unit 100, a foreground-background separating unit 101, a rectangle information generating unit 102, a rectangle transmitting unit 105, a priority determining unit 303, and a compression cropping unit 304. Functions of the respective processing units of the image processing apparatus 30 are performed by allowing the CPU (see FIG. 6) to read out and execute a computer program stored in a memory (see FIG. 6).

The priority determining unit 303 outputs all of the rectangle information to the compression cropping unit 304 even when the amount of data exceeds a data-amount threshold, unlike the processing of the rectangle selecting unit 103 of the first embodiment. However, the priority determination described in the first embodiment is performed, and priority information indicating a priority order of the rectangle determined is also output.

The compression cropping unit 304 determines a compression method and a compression rate for each rectangle based on the priority information of the rectangle acquired from the priority determining unit 303. Then, camera images received from the image input unit 100 and a foreground image received from the foreground-background separating unit 101 are cropped to generate image data to be transmitted, and compression processing is performed by the determined compression method and at the determined compression rate.

In compression processing, switching control of a compression method (e.g. lossless compression, lossy compression such as JPEG), and determination of a compression rate, are performed (in the case of JPEG, adjustment of the compression rate can be achieved by adjusting a quantization parameter). For example, a rectangle having a priority equal to or more than a predetermined value may be compressed by a reversible compression method (lossless compression), and a rectangle having a priority less than the predetermined value may be compressed by an irreversible compression method (lossy compression). In addition, when there are ten rectangles, for example, a method is conceivable in which top-three rectangles with highest priorities in order are uncompressed and rectangles other than those are compressed to generate data. Further, a method is also conceivable in which a compression rate is increased to allow all data to fall within a data-amount threshold in accordance with the data-amount threshold. For example, when the amount of data is twice a data-amount threshold, the top-five rectangles may be compressed by 30%, and the bottom-five rectangles may be compressed by 70%, for example, to obtain data that falls within the data-amount threshold.

As a matter of course, as a result of compression processing, a total amount of data may exceed a data-amount threshold. In that case, data may be transmitted for rectangles that are allowed to be transmitted according to an order of priority, or compression processing may be performed again according to the order of priority to reduce the amount of data to an amount that can be transmitted.

As described above, in the present embodiment, the amount of data to be transmitted is suppressed by controlling a compression method and a compression rate based on a priority of a rectangle. This allows proper data to be left when the amount of data needs to be limited due to an excessive number of rectangles.

Suppression of data due to compression also can be performed by reducing resolution according to a priority, other than using an encoding method. That is, resolution is reduced to ¼ for a rectangle with a low priority, and is reduced to ½ for a rectangle with an intermediate priority, and the resolution is not changed for a rectangle with a high priority. Likewise, a bit depth may be reduced to control the amount of data.

Modification

Consider a case in which the foreground-background separating unit 101, the rectangle information generating unit 102, and the rectangle selecting unit 103 perform processing in parallel operations. When the rectangle selecting unit 103 determines that a total of the amount of data of each rectangle exceeds a data-amount threshold based on rectangle information, in a certain frame, the entire processing may be stopped.

In this case, the rectangle selecting unit 103 determines whether the total of the amount of data of each rectangle exceeds the data-amount threshold that can be processed and transmitted. Then, when it is determined that the total exceeds the data-amount threshold, the foreground-background separating unit 101 and the rectangle information generating unit 102 are required to interrupt processing of the certain frame.

Accordingly, the foreground-background separating unit 101 and the rectangle information generating unit 102 need not perform wasteful processing, so that computation resources can be conserved to enable high-speed processing.

According to the present disclosure, appropriate data can be transmitted.

Other Embodiments

Embodiment(s) of the present disclosure can also be realized by a computer 1 of a system or apparatus that reads out and executes computer executable instructions (e.g., one or more programs) recorded on the storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors 3 (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk 5A, a random-access memory 5B (RAM), a read only memory 5C (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-240138, filed on Dec. 21, 2018, which is hereby incorporated by reference wherein in its entirety.

What is claimed is:

1. An image processing apparatus comprising:
one or memories storing instructions; and
one or more processors executing the instructions to:
specify plurality of regions each including at least one object from an image captured by an image capturing device for generating a virtual viewpoint image; and
select, based on a size of each of the specified plurality of regions, a region from among the specified plurality of regions, a size of the selected region being larger than a size of a region, among the specified plurality of regions, that has not been selected, and the region that has not been selected being not transmitted.

2. The image processing apparatus according to claim 1, wherein the region is selected further based on coordinates of each of the specified plurality of regions.

3. The image processing apparatus according to claim 1, wherein the region is selected further based on distances between coordinates of each of the specified plurality of regions and reference coordinates.

4. The image processing apparatus according to claim 3, wherein the region is selected, in order from a specified region, from among the specified plurality of regions, having the shortest distance to a specified region, from among the specified plurality of regions, reaching a data-amount threshold that is processable and transmissible.

5. The image processing apparatus according to claim 1, wherein the region is not selected from the specified plurality of regions having a size exceeding a threshold.

6. The image processing apparatus according to claim 1, wherein:
the one or more processors further execute the instructions to determine the sizes of the specified plurality of regions based on the number of pixels for forming each of the specified plurality of regions, and
the region is selected based on the number of pixels forming each of the specified plurality of regions.

7. The image processing apparatus according to claim 1, wherein the region is selected further based on an aspect ratio of each of the specified plurality of regions.

8. The image processing apparatus according to claim 1, wherein:
the one or more processors further execute the instructions to determine, based on the size of each of the specified plurality of regions, an effectiveness of each of the specified plurality of regions, and
the region is selected further based on the determined effectiveness of each of the specified plurality of regions.

9. The image processing apparatus according to claim 8, wherein the region is not selected from any specified region determined to be ineffective.

10. The image processing apparatus according to claim 1, wherein the one or more processors further execute the instructions to:
compress the image corresponding to the selected region; and
transmit the compressed image.

11. The image processing apparatus according to claim 1, wherein the region is selected, in a case where a total of data amounts of data of images corresponding to the specified plurality of regions exceeds a data-amount threshold.

12. The image processing apparatus according to claim 1, wherein each of the specified plurality of regions is a rectangular region.

13. The image processing apparatus of claim 12, wherein the image corresponding to the selected region to be transmitted is a cropped image cropped according to the rectangular region.

14. The image processing apparatus according to claim 3, wherein the one or more processors, in selecting the region, sets a higher priority to a specified region, from among the specified plurality of regions, that is closer to the reference coordinates than a specified region, from among the specified plurality of regions, farther from the reference coordinates.

15. The image processing apparatus according to claim 1, wherein the one or more processors further executes the instructions to control transmission of an image corresponding to the selected region.

16. The image processing apparatus according to claim 1, wherein the object is a foreground object different from a background object in the image captured by the image capturing device.

17. The image processing apparatus according to claim 1, wherein the object is an object extracted by comparing the image captured by the image capturing device with a background image.

18. The image processing apparatus according to claim 1, wherein the object is an object extracted by learning recognition.

19. The image processing apparatus according to claim 15, wherein the transmission of the images corresponding to the selected region is controlled based on a total of data amounts of images corresponding to the specified plurality of regions.

20. The image processing apparatus according to claim 1, wherein the one or more processors further executes the instructions to transmit an image corresponding to the selected region.

21. A control method performed by an image processing apparatus configured to process an image, the control method comprising:
specifying more plurality of regions each including at least one object from an image captured by an image capturing device for generating a virtual viewpoint image; and
selecting, based on a size of each of the specified plurality of regions, a region from among the specified plurality of regions, a size of the selected region being larger than a size of a region, among the specified plurality of regions, that has not been selected, and the region that has not been selected being not transmitted.

22. A non-transitory computer-readable storage medium storing a computer program executable by a computer to execute a control method comprising:
specifying plurality of regions each including at least one object from an image captured by an image capturing device for generating a virtual viewpoint image; and
selecting, based on a size of each of the specified plurality of regions, a region from among the specified plurality of regions, a size of the selected region being larger than a size of a region, among the specified plurality of regions, that has not been selected, and the region that has not been selected being not transmitted.

* * * * *